United States Patent [19]

Golobay et al.

[11] 4,191,065
[45] Mar. 4, 1980

[54] THROTTLE TWIST GRIP

[76] Inventors: Gary L. Golobay, R.R. #3, Box 252, Augusta, Kans. 67010; Ted E. Deubner, 3336 Bonn St., Wichita, 67217; Anthony F. Beugelsdyk, 7509 Hale St., Wichita, both of Kans. 67212

[21] Appl. No.: 875,820

[22] Filed: Feb. 7, 1978

[51] Int. Cl.$^2$ .................... G05G 1/08; G05G 5/04; G05G 5/18
[52] U.S. Cl. ........................ 74/489; 74/506; 74/526; 74/527; 74/538; 123/182; 180/206
[58] Field of Search .............. 74/488, 489, 506, 526, 74/527, 538; 180/33 C; 123/182

[56] References Cited

U.S. PATENT DOCUMENTS

| 2,625,924 | 1/1953 | Friedlob | 123/182 |
|---|---|---|---|
| 2,776,579 | 1/1957 | Nichel, Jr. | 74/488 |
| 2,874,587 | 2/1959 | Schmid | 74/489 |

FOREIGN PATENT DOCUMENTS

| 530062 | 7/1940 | United Kingdom | 74/489 |
|---|---|---|---|
| 571489 | 9/1944 | United Kingdom | 74/489 |

*Primary Examiner*—Allan D. Herrmann
*Attorney, Agent, or Firm*—Schmidt, Johnson, Hovey & Williams

[57] ABSTRACT

A twistable type throttle-grip assembly especially adapted for use with motorcycle-like vehicles manipulates a single control cable and is normally operational in a first rotational range for controlling the supply of fuel to the vehicle's internal combustion engine thereby controlling the vehicle's speed and is provided with an integral latch mechanism which may be operated by the thumb of the operator while holding the hand grip to release the hand grip for rotation into a second rotational range associated with the operation of a cable controlled, combustion cylinder compression release device on the engine to turn off the latter and permit manual pedaling of the vehicle. The latch mechanism includes a ring-shaped latch member sleeved over the vehicle's handlebar and having an arcuate, resilient, cantilever mounted shiftable latch portion which extends into a slot within a housing therearound adjacent the end of the hand grip to permit access thereto by the vehicle's operator and is selectively shiftable into and out of engagement with the housing to permit selective shifting of the hand grip into either rotational range.

9 Claims, 8 Drawing Figures

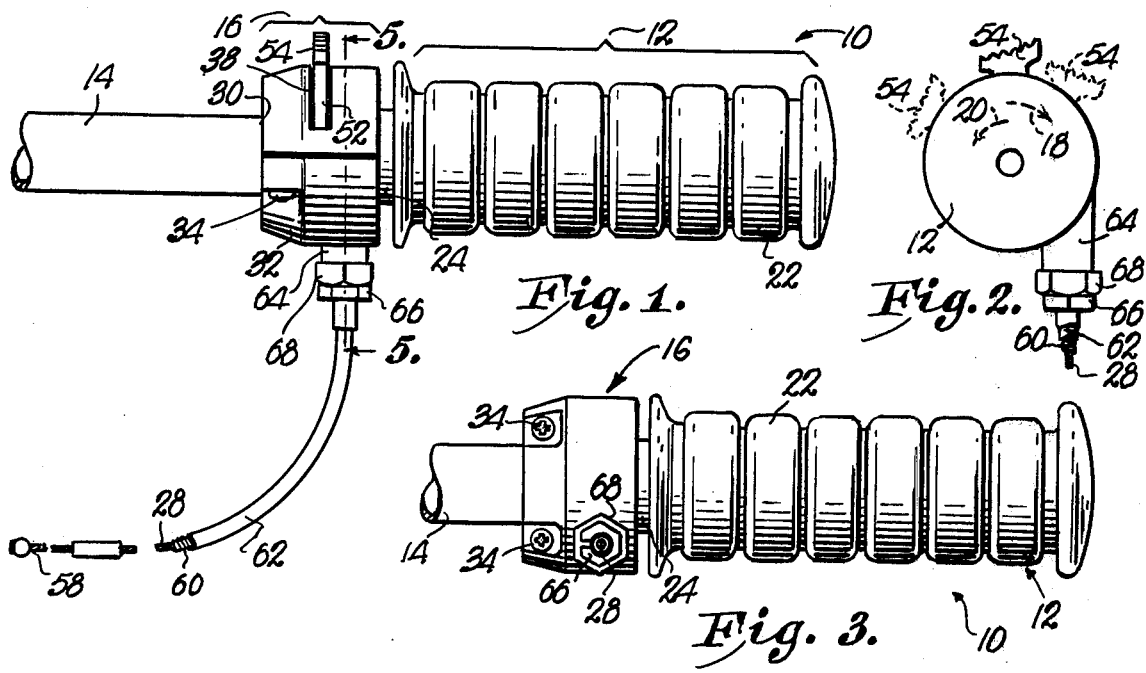
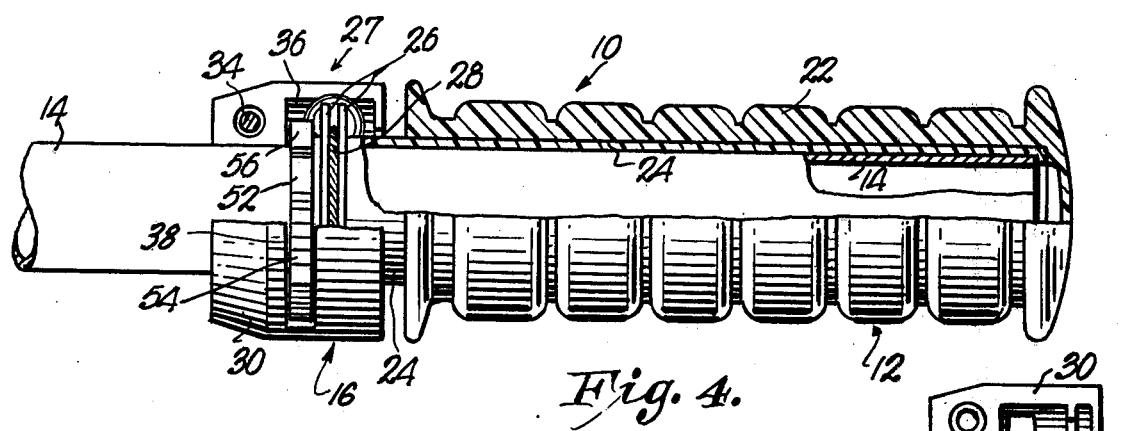
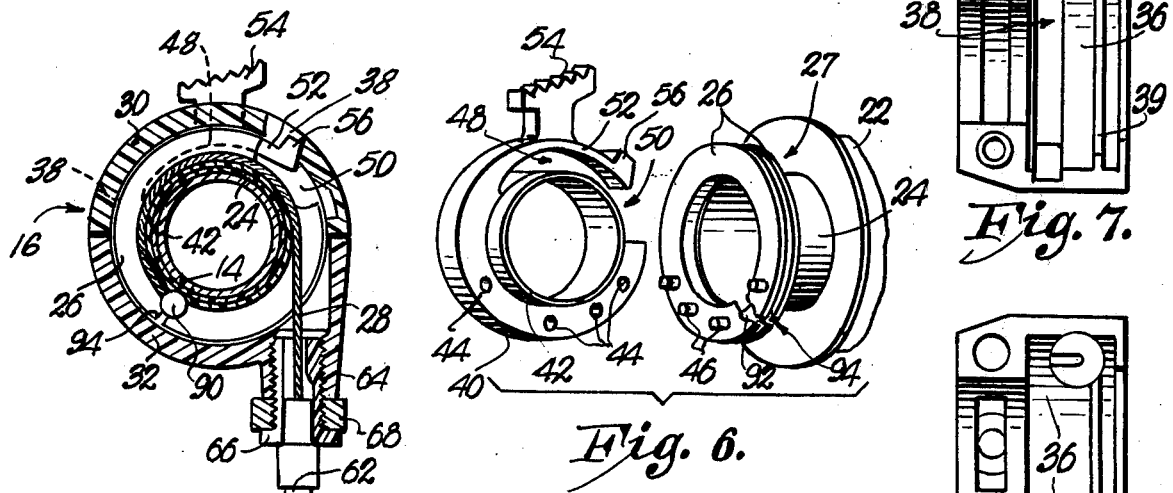
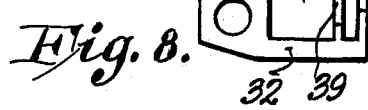

THROTTLE TWIST GRIP

TECHNICAL FIELD

This invention deals with twist grip constructions for manipulating control cables, such as a handlebar mounted motorcycle throttle, and pertains more particularly to the provision of a novel latch mechanism in the twist hand grip construction for allowing selective operation of the grip in two separate, discrete ranges of rotation in order to permit a single cable under control of the twist grip to provide a pair of operational functions.

BACKGROUND ART

Twist, hand grip type throttle constructions for controlling a cable operated carburetor and of the type mounted on the handlebars of a motorcycle or the like have been in use for many years. These constructions generally comprise an elongate tubular hand grip which is adapted to be sleeved over the end of a handlebar and is rotatably mounted on the latter by means of a collar clamp assembly which includes a housing enclosing a spool like member fastened to the end of the hand grip for winding and unwinding the control cable thereon as the grip is twisted.

Some cycle-type vehicles powered by an internal combustion engine have heretofore been provided with a compression release device associated with the combustion cylinder of the engine in order to relieve pressure built up within the cylinder for purposes of facilitating starting of the engine or, permitting the vehicle to be pedaled in the case of the so-called "moped" type vehicles which include bicycle-type pedaling apparatus in addition to a gasoline powered engine. In the past, since the operation of the compression release device is independent of the normal throttle control, the hand operated operator controls for the compression release device have been mounted separately from the vehicle's ordinary throttle control and have necessitated the provision of a separate control cable and lever assembly or other means for operating the cable to actuate the compression release device. This prior art design is less than cost effective from a manufacturing standpoint due to the additional control levers and cables required, and poses an inconvenience to the vehicle operator in that he may have to remove one of his hands from the handlebars in order to reach the controls for effecting operation of the engine compression release; this poses an obvious safety hazard for the vehicle operator since the operator's hand should desireably remain on the handlebar grips at all times.

DISCLOSURE OF INVENTION

The present invention eliminates the deficiencies inherent in the prior art approach to controlling carburetor throttling and engine compression release by providing a single twist grip assembly which is selectively operable for both controlling engine throttling and compression release. According to the present invention, a twist grip assembly including a hand grip and cable winding means is provided with a novel latch mechanism integral therewith and selectively actuatable by the thumb of the vehicle operator's hand holding the grip member to allow shifting of the grip between a first rotational range associated with an engine throttling function, and a second rotational range associated with the compression release of the engine. The latch mechanism includes a rotatable, ring-shaped latch member adapted to be sleeved over the handlebar of the vehicle which comprises an arcuately shaped, cantilever mounted, shiftable, resilient latch portion including a keeper portion extending through a slot in a stationary, mounting portion of the grip assembly and normally engages the stationary portion during ordinary throttling operation but is yieldably shiftable to release the latch mechanism and allow the vehicle operator to rotate the twist grip in a manner to effectuate actuation of the compression release device. Thus, the vehicle operator need not remove either of his hands from the handlebars in order to effectuate compression release of the engine, and the carburation throttling and engine compression release functions are controlled by a single, handlebar mounted control assembly employing a single control cable.

BRIEF DESCRIPTION OF DRAWINGS

In the drawings:

FIG. 1 is a longitudinal view of one side of the throttle twist grip assembly, which forms the preferred embodiment of the present invention, shown in operative relationship to a portion of a handlebar and a cable assembly controlled thereby;

FIG. 2 is a view of one end of the twist grip assembly shown in FIG. 1;

FIG. 3 is a bottom plan view of the twist grip assembly;

FIG. 4 is a fragmentary, top view of the twist grip assembly taken on a slightly larger scale, portions being broken away to better reveal components located within the clamp assembly;

FIG. 5 is a view taken along the line 5—5 in FIG. 1 and which shows the assembly in an idle position;

FIG. 6 is a perspective view of one end of the tubular grip member and showing a ring-shaped latch member having been removed therefrom;

FIG. 7 is a plan view of interior portions of the upper half of the clamp assembly; and FIG. 8 is a plan view of interior portions of the lower half of the clamp assembly.

BEST MODE FOR CARRYING OUT THE INVENTION

Turning now to the drawings, a throttle twist grip assembly generally indicated by the numeral 10 includes a grip section 12 mounted on an end of the handlebar 14 by means of the clamp assembly 16 for angular rotation in either of two directions as indicated by the arrows 18 and 20 in FIG. 2. Grip section 12 comprises a suitable grip covering 22 encircling and conformally attached to an elongate, tubular member 24 which is sleeved over one end of the handlebar 14 and is rotatable with respect to the latter. The end of tubular member 24 adjacent the clamp assembly 16 is essentially open and includes a pair of circular, spaced rib members 26 around the exterior thereof which form a pulley or spool means 27 upon which one extremity of the control cable 28 is wound and unwound upon rotation of the grip section 12.

Clamp assembly 16 may be manufactured as by molding from plastic or metal alloys and comprises an upper half 30 and a lower half 32 joined together and held fast to the handlebar 14 by means of a pair of screws 34. The upper and lower half 30 and 32 respectively of the clamp assembly 16 each include generally open interior areas 36 forming in combination with the handlebar 14, a housing defining a ring-shaped, cylinderical cavity therewith. The upper half 30 of the clamp assembly 16 includes an arcuate, elongate slot 38 extending essentially perpedicular to the longitudinal axis of the handle bar 14, and extending circumferentially, partially around the curved exterior surface of clamp assembly 16 placing the open interior areas 36 of the latter in communication with the area outside the collar housing 16 and adjacent the grip section 12. As best seen in FIG. 4, the spool means 27 adjacent one extremity of the tubular member 24 is disposed within the open interior areas 36 of the clamp assembly 16, one of the ribs 26 being slidably engagable with an annular shoulder formed by upstanding edges 39 on the upper and lower half 30 and 32 respectively of the clamp assembly 16.

Latch means including a latch ring member 40 is adapted to be fastened to the tubular member 24 adjacent the spool means 27 and comprises an annular sleeve 42 insertable in a slip-fit manner into the open end of the tubular member 24, and is provided with a plurality of circumferentially spaced, cylinderical cavities 44 in one side thereof of suitable configuration to matingly receive the stud elements 46 circumferentially spaced and depending from the adjacent rib member 26. Latch ring member 40 preferably comprises a resilient molded plastic material such as "DELRIN" and includes an arcuate cut-out segment 48 therein, between the inside and outside diameter thereof, which cut-out segment extends circumferentially around a portion of the member 40. An opening or cut-out area 50 is provided between the cutout segment 48 and exterior surface portions of the latch member 40 to create a relatively thin, resilient, arcuately shaped appendage or latch portion 52 having a free extremity thereof adjacent the opening 50, the opposite extremity of latch portion 52 being mounted in cantilever fashion to the main body of latch ring member 40. An actuating portion 54 comprising an upstanding, manually engagable member is secured to the outer surface of latch portion 52, and is preferably molded integral with the latter, while an upwardly projecting latching or keeping portion 56 depends outwardly from the free extremity of latch portion 52.

As best seen in FIG. 4, with the latch member 40 fastened to the tubular member 24, the member 40 is sleeved over the handlebar 14, essentially concentric with respect to the tubular member 24, and is rotatably disposed within the open interior portions 36 of the clamp assembly 16, the outside diameter of latch member 40 being marginally smaller than the diameter of the cylinderical cavity formed by the open interior areas 36. The actuating portion 54 extends out through the slot 38 to a position adjacent the grip section 12 which is easily accessable by the thumb of the vehicle operator's hand gripping the grip section 12, while the keeper portion 56 also extends up into the slot 38 and normally remains disposed therewithin until the latch portion 52 is unlatched in a manner later described. It can be appreciated from the foregoing, that the latch member 40 is fastened to the tubular member 24 through the spool means 27 and slidably engages interior surface portions of the clamp assembly 16 upon rotation of the tubular member 24 by the vehicle's operator, while the clamp assembly 16 itself remains in a fixed position on the handlebar 14.

The remote end 58 of the cable 28 will be suitably connected with the carburation structure (not shown) of the vehicle's engine (not shown) and will also be suitably coupled with the compression release device (not shown) associated with the engine's combustion chamber. The specific manner in which the remote end 58 of the cable 28 is so fastened will depend upon the particular configuration of the engine which may vary with the various types of vehicles involved. However, it is understood that those skilled in the art may readily devise appropriate mechanism for coupling the vehicle's carburetor structure and compression release device to the single control cable 28. Typically, the compression release device will be coupled to the cable 28 in such a manner to be actuated only on those occasions when the cable 28 has been shifted a prescribed distance in a preselected direction.

The cable 28 is of the known variety and is trained through a metal jacket 60 having a protective sheath 62 such as vinyl plastic formed therearound. Lower half 32 of the clamp assembly 16 includes a funnel-like conduit 64 projecting from the circumference thereof which includes an apperture in the end thereof, interior surface portions of the conduit 64 being threaded to threadably receive the adjustable insert 66 whose position within the conduit 64 may be adjusted by the provision of a securement nut 68 threadably engaging the insert 66 and contacting the end of the conduit 64. The proximal end of the cable 28 includes a retaining element 90 in the nature of a cylindrically shaped fitting secured thereto which is inserted through an access opening 92 in one of the rib members 26 adjacent the latch member 40, and is retained within recessed portions 94 between the rib members 26.

In operation, the grip section 12 is twistable in a first rotational range from a first throttle position corresponding to an idling condition of the vehicle's engine in which the keeper portion 56 is disposed at one end of the slot 38 and engages the upper half 30 of the clamp assembly 16, to a second throttle position corresponding to a full throttle condition of the engine wherein the actuating portion 54 is shifted to a position adjacent the other end of the slot 38 and engages portions of the upper half 30 of the clamp assembly 16; thus it is apparent that the first rotational latitude or "range" given to the grip section 12 is determined by the spacing on the latch portion 52 between the actuating portion 54 and keeper portion 56. Under ordinary conditions when the vehicle's engine is providing motive power, the engine speed is being controlled by the throttle twist grip 10 and the grip section 12 is operable in the normal manner between the idle and full throttle positions mentioned above. Upon twisting of the grip section 12, the cable 28 trained around the tubular member 24 and confined between the rib members 26 is wound upon the spool means 27 and is shifted toward and twist grip assembly 10 as the grip section 12 is shifted from an idle toward the full throttle position, while the cable 28 is unwound upon twisting of the grip portion 12 from a full throttle position to an idle position in the direction of the arrow 18. With the grip section 12 disposed in its idle position with the keeper portion 56 contacting one end of the slot 38, the vehicle's operator may effectuate compression release of the engine's cylinder chamber merely by thumb depression of the actuating portion 54 and rotation of the grip section 12 into a second latitude or "range" of rotation in the direction of the arrow 18. Upon depression of the actuating portion 54, the keeper portion 56 shifts inwardly toward handlebar 14 and into the cut-out segment 48, in clearing relationship with the clamp assembly 16, to permit further rotation of the grip section 12 past the normal idle position until the actuating portion 54 comes into contact with the clamp assembly 16 at the end of the slot 38, during which rotation the cable 28 will be shifted in a direction away from the throttle twist grip assembly 10 a distance correlatable to the distance between the actuating portion 54 and keeper portion 56. As the actuating portion 54 is depressed and grip section 12 is rotated into the compression release range, the cable 28 functions to actuate the engine's compression release device, which device is maintained in its actuated state until the grip section 12 is rotated back toward its idle position in the direction of the arrow 20, whereupon the keeper portion 56, by virtue of the resiliency of the latch portion 52 which is biased outwardly along the interior of the collar housing 16, springs outwardly back into its latched position within the slot 38 thereby relatching the throttle twist grip 10 in its throttling range of rotation until subsequently unlatched by the operator of the vehicle.

INDUSTRIAL APPLICABILITY

The application and method of use of the throttle twist-grip which forms the present invention has been made apparent by the foregoing description. The novel latch assembly uniquely cooperates with a twist-grip type control to provide both a throttling and compression release control function using a single control cable. The twist grip construction, by virtue of the provision of a novel, cost effective, reliable latch mechanism also has clear application where it is desired to provide any of various types of twist grips with a pair of separate, descrete ranges of rotational operation.

From the foregoing, it is clear that the invention provides a twist-grip control having a pair of separate, selectable rotational ranges which may be operatively associated with differing control functions through the provision of a novel latch construction. It is recognized, of course, that those skilled in the art may make various modifications or additions to the preferred embodiment chosen to illustrate the invention without departing from the gist and essence thereof. Accordingly, it is to be understood that the protection sought and to be afforded hereby should be deemed to extend to the subject matter claimed and all equivalents thereof fairly within the scope of the invention.

What is claimed and desired to be secured by Letters Patent is:

1. A twistable grip assembly for shifting a flexible control line and of the type supported on a handlebar or the like comprising:
   an elongate, hand grip section;
   means adapted to be secured to said handlebar adjacent one extremity of said grip section and slidably engaging the latter for rotatably mounting said grip section on said handlebar;
   spool means fastened to said grip section adjacent said one extremity of the latter for winding and unwinding said line thereon in response to rotation of said grip section; and
   latch means fastened to the combination of said spool means and said grip section for selectively controlling the displacement through which said grip section may be rotated,
   said latch means including a manually operable, shiftable actuating portion, and a shiftable keeper portion under control of said actuating portion,
   said keeper portion being rotatable along with said grip section and engageable with said mounting means upon rotation of said grip section in one rotational direction whereby to limit the rotation of said grip section to a first degree of displacement in said one direction,
   said keeper portion being shiftable away from said mounting means in response to the operation of said actuating portion to allow further rotation of said grip section to a second degree of displacement in said one direction beyond said first degree of displacement.

2. The invention of claim 1, wherein:
   said grip section comprises a tubular portion adapted to be sleeved over said handlebar,
   said mounting means including a generally hollow collar structure adapted to circumscribe at least portion of said handlebar and provided with open interior areas for receiving said spool means and at a least part of said latch means therein,
   said collar structure including an arcuate slot therein extending around a portion of the periphery thereof proximal to said grip section and placing said interior areas in communication with the open outside area around said collar structure adjacent said one extremity of said grip section,
   said actuating portion extending from said interior areas of said collar structure out through said slot whereby to provide access thereto by the hand of an operator gripping said grip section,
   said keeper portion normally extending from said interior areas into said slot at a position spaced from said actuating portion and being operative to shift toward one end of said slot upon rotation of said grip section and into engagement with said collar structure at said one end of the latter whereby to limit rotation of said grip section to said first degree of displacement,
   said actuating portion being operative upon actuation thereof to shift said keeper portion out of said slot and into a disengaged position in clearing relationship to said collar structure whereby to allow further rotation of said grip member to said second degree of displacement in said one direction.

3. The invention of claim 2, wherein said latch means comprises:
   a relatively thin, elongate, arcuately shaped resilient element disposed within said interior areas of said collar structure in a position of rotating registration with said slot and beneath the latter,
   one extremity of said resilient element being mounted within said interior areas in cantilever fashion,
   said actuating portion and said keeper portion being mounted on said resilient element,
   at least stretches of said resilient element adjacent the opposite extremity of the latter being yieldably bendable away from said slot upon operation of said actuating portion whereby to shift said keeper portion to said disengaged position thereof,
   said collar structure being provided with interior surface portions conformingly contacting said resilient element and including a pair of spaced wall portions respectively slidably engaging opposite longitudinal sides of said resilient element and functioning to maintain the latter in said position of rotating registration.

4. The invention of claim 2, wherein said latch means comprises:
   a ring-shaped member of resilient material adapted to be sleeved over said handlebar, said ring-shaped member having interior surface portions defining a hole therethrough and having exterior surface portions defining the outer circumference thereof, said ring-shaped member having an arcuate cut-out segment in the thickness thereof between said interior surface portions and said exterior surface portions thereof, and extending circumferentially in an arc around a portion of said ring-shaped member, said ring-shaped member being provided with an opening between said cut-out segment and said exterior circumferential surface portions thereof, said cut-out segment and said opening defining a relatively thin, arcuately shaped flexible, resilient appendage having one end thereof secured in cantilever fashion and having the opposite end thereof freely suspended adjacent said opening, stretches of said appendage adjacent said free end thereof being yieldably bendable inwardly toward said cut-out segment, said keeper portion being mounted on said appendage adjacent said opposite end of the latter, said actuating portion being mounted on said appendage between said extremities of the latter.

5. The invention of claim 4, wherein there is further provided means on said spool means and on said ring shaped member for releasably mounting the latter to one side of the former, and said spool means includes a recessed area in said one side thereof adapted to receive a keeper element associated with one end of said control line therewithin, said ring-shaped element normally covering said recessed area when mounted on said spool means whereby to retain said keeper element within said recessed area, said ring-shaped member allowing removal of said keeper element from said recessed area when said ring-shaped member is removed from its mounted position on said spool means.

6. A handlebar mounted twist grip throttle assembly for controlling the speed and cylinder compression of an internal combustion engine in a motorcycle vehicle or the like and of the type operable for manipulating an engine control cable, including:
   an hand grip section;
   means adapted to be secured to a handlebar associated with said vehicle for rotatably mounting said grip section thereon;
   means on said hand grip section adapted for fastening said control cable thereto, said control cable being shiftable in response to the manual rotation of said grip section,
   said grip section being normally rotatable in a first rotational range for shifting said cable to affect the delivery of fuel to said engine whereby to control the speed of latter,
   said first range including a first grip section position corresponding to an idle speed condition of said engine and a second grip section position corresponding to a full-throttle speed condition of said engine,
   said grip section being also rotatable into a second rotational range different than said first range for effecting the compression release of said engine; and
   latch means connected with the combination of said mounting means and said grip section for selectively allowing rotation of the latter between said first and second rotational ranges thereof,
   said latch means including an actuating portion adjacent said grip section and operable by a finger of the vehicle's operator hand while the latter grips said grip section,
   said latch means further including a releasable latching portion cooperating with said mounting means for normally confining the rotation of said grip section to said first rotational range thereof but being releasable in response to the operation of said actuating portion to allow rotation of said grip section from said first rotational range thereof into said second rotational range thereof whereby to effect compression release of said engine by said grip section.

7. The invention of claim 6, wherein said actuating portion and said releasable latching portion are fastened to said grip section for rotation along with the latter.

8. The invention of claim 7, wherein:
   said mounting means includes housing structure adapted to circumscribe at least portions of the circumference of said handlebar and being stationary with respect to the latter for receiving portions of said control cable therewithin,
   said housing including a slot therein extending peripherally around a portion thereof and placing the interior areas of said housing in communication with exterior areas around said housing and adjacent said grip section,
   said housing including surface area presenting an engageable stop portion adjacent one extremity of said slot,
   said latch means including a relatively thin, elongate, resilient element mounted on said grip section within said housing beneath said slot and in registration with the latter,
   said actuating portion being mounted on said resilient element and extending through said slot into said exterior areas,
   said latching portion also being mounted on said resilient element and having a normally latched position in which surface areas thereof extend into said slot and are engageable with said stop portion of said housing when said grip section is rotated to said first position thereof,
   said resilient element being shiftable in response to the operation of said actuating portion whereby to shift said surface areas of said latching portion out of said slot into clearing relationship with said stop portion and effect unlatching of said latching means to permit rotation of said grip section from said first to said second rotational ranges thereof.

9. The invention of claim 8, wherein:
   said resilient element is arcuately shaped and has one end thereof adjacent said actuating portion mounted in cantilever fashion to said grip section,
   stretches of said resilient member adjacent the opposite, free end thereof being shiftable toward and away from said slot,
   said resilient element having a width dimension exceeding the spacing between elongate walls defining said slot,
   said housing including interior wall portions conformingly engaging surfaces of said resilient element and slidable with respect to the latter.

* * * * *